United States Patent [19]

Krishnan et al.

[11] Patent Number: 5,705,546
[45] Date of Patent: Jan. 6, 1998

[54] POLYCARBONATE COMPOSITIONS HAVING IMPROVED RELEASE PROPERTIES

[75] Inventors: Sivaram Krishnan, Pittsburgh; James B. Johnson, Washington, both of Pa.

[73] Assignee: Bayer Corporation, Pittsburgh, Pa.

[21] Appl. No.: 662,572

[22] Filed: Jun. 13, 1996

[51] Int. Cl.$^6$ ........................ C08K 5/15
[52] U.S. Cl. ........................ 524/109; 264/300
[58] Field of Search ................ 524/114, 109, 524/611; 549/555; 523/136; 264/300

[56] References Cited

U.S. PATENT DOCUMENTS

| | | | |
|---|---|---|---|
| 2,671,064 | 3/1954 | Cowell et al. | 524/114 |
| 3,186,961 | 6/1965 | Sears | 524/114 |
| 3,499,866 | 3/1970 | Schwab | 549/555 |
| 3,784,595 | 1/1974 | Schirmer et al. | 260/18 TN |
| 3,836,499 | 9/1974 | Schirmer et al. | 260/31.2 R |
| 4,007,150 | 2/1977 | Adelmann et al. | 260/30.8 R |
| 4,065,436 | 12/1977 | Adelmann et al. | 260/47 XA |
| 4,097,435 | 6/1978 | Rawlings et al. | 260/28 R |
| 4,131,575 | 12/1978 | Adelmann et al. | 260/17.4 R |
| 4,143,024 | 3/1979 | Adelmann et al. | 260/31.2 XA |
| 4,145,329 | 3/1979 | Mark et al. | 524/110 |
| 4,446,268 | 5/1984 | Lee | 524/315 |
| 4,556,681 | 12/1985 | Liberti et al. | 524/114 |
| 4,722,955 | 2/1988 | Dick | 524/114 |
| 4,760,107 | 7/1988 | Nelson | 524/114 |
| 4,894,401 | 1/1990 | Nelson | 524/114 |
| 5,001,180 | 3/1991 | Lundy et al. | 524/314 |
| 5,246,999 | 9/1993 | Wielgosz et al. | 524/114 |

*Primary Examiner*—Veronica P. Hoke
*Attorney, Agent, or Firm*—Joseph C. Gil; Aron Preis

[57] ABSTRACT

A thermoplastic molding composition having improved release properties is disclosed. The composition contains a polycarbonate and an additive amount of an epoxy conforming structurally to

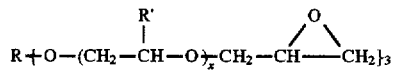

where R is a member selected from the group consisting of glyceryl and trimethyl propyl radicals, x is 0 to 20 and R' is a $C_{1-4}$ alkyl radical.

10 Claims, No Drawings

POLYCARBONATE COMPOSITIONS HAVING IMPROVED RELEASE PROPERTIES

FIELD OF THE INVENTION

The invention relates to thermoplastic molding compositions and in particular to compositions based on polycarbonates.

SUMMARY OF THE INVENTION

A thermoplastic molding composition having improved release properties is disclosed. The composition contains a polycarbonate and an additive amount of an epoxy conforming structurally to

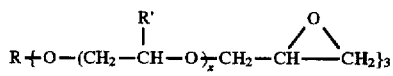

where R is a member selected from the group consisting of glyceryl and trimethylol propyl radicals, x is 0 to 20, and R' is a $C_{1-4}$ alkyl radical.

BACKGROUND OF THE INVENTION

Polycarbonates are widely used engineering thermoplastics because they feature an attractive set of physical and mechanical properties. A disadvantage is, however, associated with their processing in that they have poor release properties. In an injection molding application, this disadvantage translates to relatively long cycle times. Shorter cycle times have been attained by injection molding at higher temperatures and by using mold release agents. Improving the release properties of polycarbonate compositions by the incorporation of long chain aliphatic carboxylic acid esters of monohydric and trihydric alcohols has been reported in German published Specifications DOS 2,064, 095 and 2,220,185. U.S. Pat. No. 4,007,150 disclosed the use of perfluoroalkane sulfonic acid amides and/or cyclic ammonium salts of such acids as mold release agents. Relevant technology has been disclosed in U.S. Pat. No. 3,784,595 which refers to polycarbonate molding compositions having improved release properties containing an ester of trihydric alcohol and a $C_{10-22}$-saturated aliphatic carboxylic acid. These esters are said to be effective mold release agents, without at the same time causing a measurable quality lowering degradation of the polycarbonate. Also relevant in this context is U.S. Pat. No. 3,836,499 which disclosed esters of monovalent $C_{10-35}$-alcohols and aliphatic saturated $C_{8-25}$-monocarboxylic acids. U.S. Pat. Nos. 4,131, 575 and 4,143,024 disclosed relevant mold release technology entailing polycarbonate compositions and esters of saturated aliphatic carboxylic acid and respectively, 4-hydric to 6-hydric alcohols, and aromatic hydroxy compounds with from 1 to 6 OH groups. Also relevant is U.S. Pat. No. 4,446,268 which disclosed an asymmetric carboxylic acid ester having a long chain alcohol component said to have effective mold releasing properties in several thermoplastic resins, including polycarbonates. U.S. Pat. No. 4,065,436 is noted for the disclosure of a polycarbonate composition and a particular ester having good release properties; U.S. Pat. No. 4,097,435 disclosed glass fiber reinforced polycarbonate compositions containing ester wax of montanic acid as a release agent and U.S. Pat. No. 5,001,180 disclosed a monoester derived from guerbet alcohol to be a mold release agent for polycarbonates.

DETAILED DESCRIPTION OF THE INVENTION

Aromatic polycarbonates within the scope of the present invention include homopolycarbonates and copolycarbonates and mixtures thereof. The suitable polycarbonates have a weight average molecular weight of 10,000 to 200,000, preferably 20,000 to 80,000 and their melt flow rate, per ASTM D-1238 at 300° C., is about 1 to about 65 g/10 min., preferably about 2 to 24 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

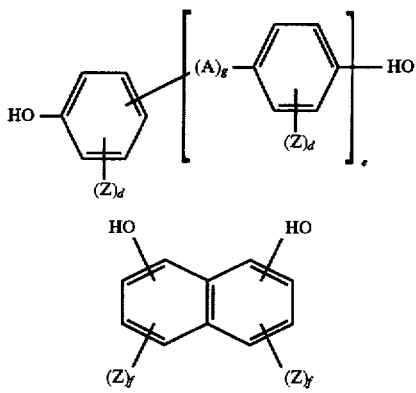

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO—, or —$SO_2$— or a radical conforming to

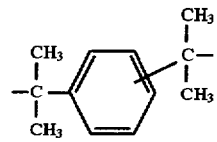

e and g both denote the number 0 to 1; Z denotes F, Cl, Br or $C_{1-4}$-alkyl and if several Z radicals are substituents in one awl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 5,126,428; 5,104,723; 5,041,521; 5,034,457; 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4- hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl) propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-1,3,3 trimethyl cyclohexane. The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxyl compounds. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxy-triphenylmethyl) benzene. Some of the other polyfunctional compounds are 2,4-dihydroxybenzoic acid, trimesic acid, cyanuric chloride and 3,3-bis-(4-hydroxyphenyl)2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon 2400, Makrolon 2600, Makrolon 2800 and Makrolon 3100, all of which are Bisphenol-A based homopolycarbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. These are products of Bayer Corporation of Pittsburgh, Pa.

Polycarbonate resins suitable in the practice of the invention are known and their structures and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

The mold release agent in accordance with the present invention is an epoxy conforming structurally to

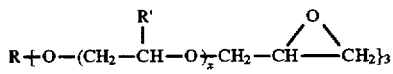

where R is a member selected from the group consisting of

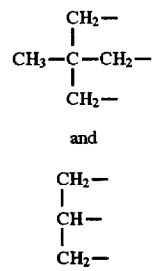

and $$\begin{array}{c} CH_2- \\ | \\ CH- \\ | \\ CH_2- \end{array}$$

x is 0 to 20, preferably 0 to 10, most preferably 8 and R' is a $C_{1-4}$ alkyl radical, preferably methyl radical.

An epoxy compound suitable as a mold release agent in accordance with the invention may be obtained commercially as Heloxy 84 modifier and Heloxy 44 modifier, from Shell Chemical Company.

The amount of the mold release agent to be added to the carbonate polymer is a positive amount which is sufficient to impart to the composition improved mold release property, the improvement determined in comparison to a corresponding composition which does not contain the inventive agent. Preferably, the composition of the invention contains about 0.1 to 2, preferably 0.2 to 1.0, percent of the mold release agent, said percent being relative to the weight of the composition.

The incorporation of the release agent into the polycarbonate follows standard techniques, including tumble blending the release agent with the polycarbonate pellets followed by extruding (at about 280°–300° C.) to form a strand which is then pelletized.

The method for determination of release force for the purpose of comparing the efficiencies of mold release agents is well known. Essentially, the injection cylinder of an injection molding machine, for instance a 4 oz. Newbury, is equipped with a pressure transducer to measure and record the force during the ejection phase of molding a 90 mm diameter flat disc. The mold is characterized in that it has four intersecting 5 mm high by 1 to 2 mm thick tapered ribs laid out in a grid pattern. There are 4 ejector pins at the intersections of the ribs and 4 ejector pins along the perimeter of the disc. The mold is designed with minimum draft on the ribs to promote the tendency of the part to stick to the core. The moldings are injected at a melt temperature of 280° C. with a cycle time of 45 seconds between injections. The mold is maintained at a set point temperature of 79.5° C. The release force values reported below represent averages of the last 12 consecutive mold ejection hydraulic pressure values taken after the mold has stabilized, usually after 25 to 30 ejections.

The invention is further illustrated but is not intended to be limited by the following examples in which all parts and percentages are by weight unless otherwise specified.

EXAMPLES

Compositions in accordance with the invention have been prepared and their mold release properties determined. The results are summarized below. In preparing the compositions, the carbonate polymer was a homopolycarbonate based on bisphenol-A and characterized in that its melt flow index was 18 g/10 min. as determined in accordance with ASTM D-1238 (Makrolon 2508 resin, a commercial product of Bayer Corporation); the mold releasing agents representative of the present invention used in the course of the experiments are referred to below as HM44 and HM84 conform respectively to

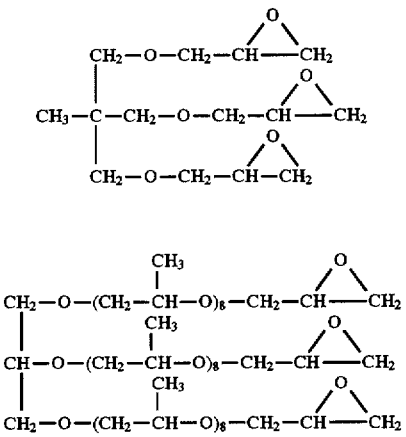

The table below summarizes the experimental work; the compositions contain only polycarbonate resin and the indicated amounts of the mold releasing agents: the melt flow rate values in g/10 min. (MFR) were measured in accordance with ASTM D-1238; the optical properties: total light transmission (TLT) was determined in accordance with ASTM D-1003 and the yellowness index (YI) was measured in accordance with ASTM D-1925. The indicated values of ΔYI represent the difference between the initial YI and the measured value thirteen days after exposure to 3.0 Mrad exposure to gamma radiation (cobalt 60). The results are presented below.

TABLE

|  | 1 | 2 | 3 | 4 | 5 | 6 | 7 |
|---|---|---|---|---|---|---|---|
| Release agent | none | HM44 | HM44 | HM44 | HM84 | HM84 | HM84 |
| amount (%) | 0.0 | 0.5 | 0.75 | 1.0 | 0.5 | 0.75 | 1.0 |
| MFR[1] | 15.4 | 15.2 | 17.2 | 13.6 | 15.4 | 13.7 | 12.8 |
| ΔMFR[2] | 14.4 | n.d[3] | n.d | n.d | 11.8 | 11.6 | 12.3 |
| Release Force (bars) | 27 | 24 | 24 | 23 | 24 | 23 | 22 |
| TLT | 89.5 | 89.1 | 88.9 | 88.8 | 89.2 | 89.4 | 89.1 |
| YI (initial) | 2.6 | 2.9 | 3.2 | 3.7 | 3.6 | 2.5 | 2.6 |
| ΔYI | 14.6 | 11.4 | 10.8 | 10.0 | 10.7 | 8.4 | 7.7 |

[1]melt flow rate (g/10 min) measured in accordance with ASTM D-1238;
[2]MFR measured after autoclaving in steam at 120°C., 15 psi for 24 hours;
[3]not determined.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition consisting essentially of carbonate polymer and about 0.1 to 2 percent relative to the weight of said composition of a mold releasing compound conforming structurally to

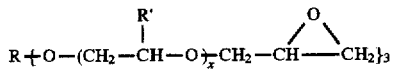

where R is a member selected from the group consisting of

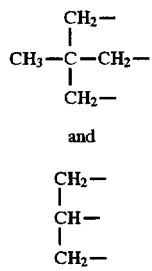

x is 0 to 20 and R' is a $C_{1-4}$ alkyl radical, said composition exhibiting improved mold release as compared to a corresponding composition which contains no such compound.

2. The thermoplastic molding composition of claim 1 wherein said x is 0 to 10.

3. The thermoplastic molding composition of claim 1 wherein x is 8.

4. The thermoplastic molding composition of claim 1 wherein R' is a methyl radical.

5. The thermoplastic molding composition of claim 1 wherein said carbonate polymer is a homopolycarbonate based on bisphenol-A.

6. A molded article comprising the composition of claim 1.

7. A thermoplastic molding composition consisting essentially of carbonate polymer and about 0.1 to 2 percent relative to the weight of said composition of a compound conforming to

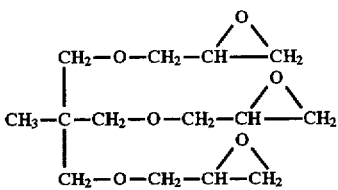

8. A thermoplastic molding composition consisting essentially of carbonate polymer and about 0.1 to 2 percent relative to the weight of said composition of a compound conforming to

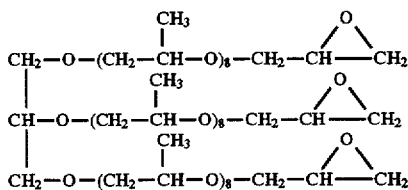

9. The composition of claim 7 wherein said compound is present in an amount of about 0.1 to 1.0 percent relative to the weight of said composition.

10. The composition of claim 8 wherein said compound is present in an amount of about 0.1 to 1.0 percent relative to the weight of said composition.

* * * * *